US006679457B1

United States Patent
Meffe et al.

(12) United States Patent
(10) Patent No.: US 6,679,457 B1
(45) Date of Patent: Jan. 20, 2004

(54) REACTION WHEEL SYSTEM WITH VERNIER CONTROL ROTOR

(75) Inventors: Marc E. Meffe, Glendale, AZ (US); Jack H. Jacobs, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/341,753

(22) Filed: Jan. 13, 2003

(51) Int. Cl.[7] .................................................. H64G 1/28
(52) U.S. Cl. ....................... 244/165; 244/3.15; 244/3.2; 244/79; 74/5.34
(58) Field of Search .................................. 244/3.15, 3.2, 244/3.21, 79, 165; 74/5.34, 5.37

(56) References Cited

U.S. PATENT DOCUMENTS 2,898,766 A * 8/1959 Pittman
3,204,467 A * 9/1965 Fischel
3,526,795 A * 9/1970 Pecs .............................. 244/165
5,906,338 A * 5/1999 Surauer et al. ............. 244/165
6,439,510 B1 * 8/2002 Barde .......................... 244/165

* cited by examiner

Primary Examiner—Galen L. Barefoot

(57) ABSTRACT

A reaction wheel system is provided that includes at least two rotors. The first rotor is the primary rotor that provides the large output torques to the vehicle. The second rotor is a vernier control rotor. The primary rotor and vernier control rotor each rotate about a common axis. The vernier control rotor has an inertial mass that is less than the inertial mass of the primary rotor, and rotates independently of the primary rotor. Because the vernier control rotor can be rotated independently from the primary rotor, it can be used to significantly improve the performance of the reaction wheel system. Specifically, the vernier control rotor is used to provide relatively small output torques. These relatively small output torques can be used to reduce the disturbances created by motor ripple, provide precise torque output control and/or reduce the disturbances created by static friction.

20 Claims, 4 Drawing Sheets

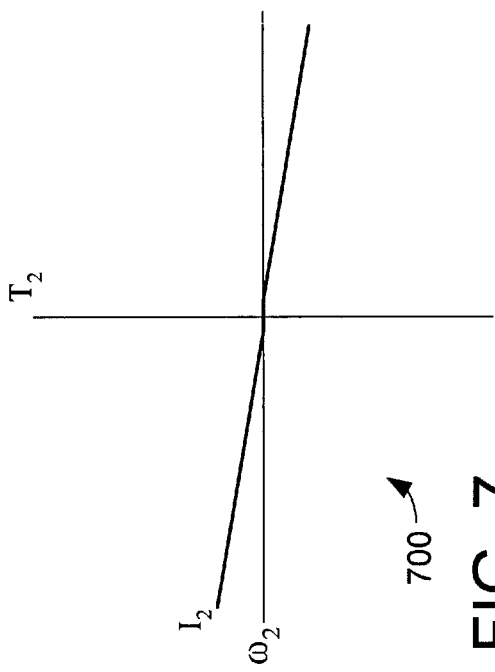
FIG. 6 — 600
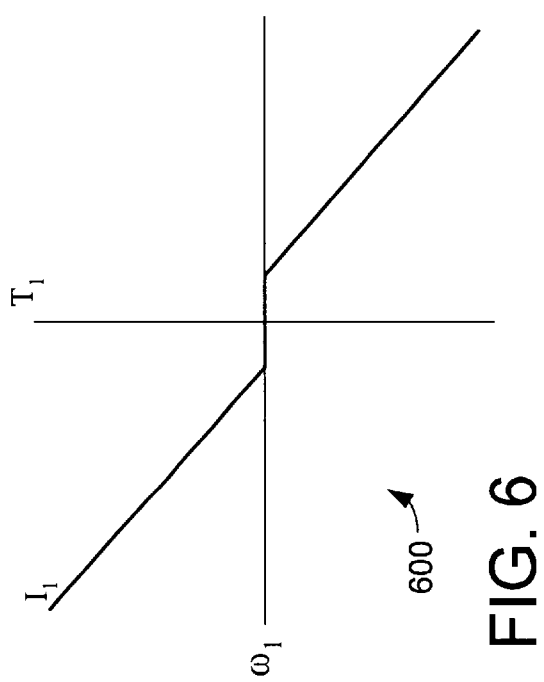
FIG. 7 — 700
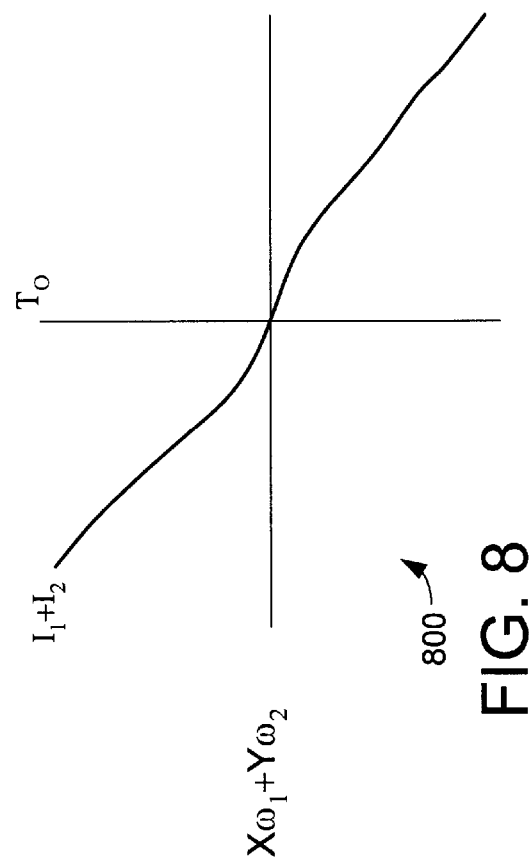
FIG. 8 — 800

REACTION WHEEL SYSTEM WITH VERNIER CONTROL ROTOR

FIELD OF THE INVENTION

This invention generally relates to reaction wheels used to provide attitude control for spacecraft, and more specifically applies to reaction wheel arrays.

BACKGROUND OF THE INVENTION

Reaction wheels are commonly used to provide attitude control for a variety of spacecraft. Reaction wheels typically comprise a rotor, bearings and motor, with the reaction wheel coupled to the vehicle structure. The motor provides the ability to vary the wheel speed of the rotor. As the rotor speed is varied, a momentum exchange occurs and the motor provides a torque on the vehicle about the spin axis.

In most applications, multiple reaction wheels are used in a reaction wheel array. The multiple reaction wheels in the array are arranged so that their spin axes span three dimensions for three axis control. Arranging the multiple reaction wheels in this way allows the array to apply torque to the vehicle along different axes, generally all three. Torque can be selectively applied to these axes to provide attitude control of the vehicle.

There are several problems associated with reaction wheels that are commonly used today. A first problem is that reaction wheels generally have limited precision in their output torque. Typically, reaction wheels are designed to provide a specific maximum amount of torque. This maximum torque limits the resolution of smaller torques within the torque range by the minimum increment of command resolution. For instance, the digital electronics used to control the torque may impede precise control by limiting changes in command torque to a fixed number of steps (sometimes called the minimum torque impulse bit). For example, a reaction wheel that uses a 16-bit controller to control the commanded torque necessarily limits the output torque to one of $2^{15}$ increments. Thus, it has been difficult with traditional reaction wheels to make more precise adjustments in the amount torque produced by the reaction wheel beyond these limitations.

Another problem in typical reaction wheels are the disturbances created by static friction as the reaction wheel speed goes through zero. As a reaction wheel approaches zero speed static friction becomes the characteristic form of friction, and causes disturbances that can be distributed throughout the vehicle as the wheel attempts to move away from zero speed. This commonly occurs when the reaction wheel changes direction of rotation. The region in which static friction creates disturbances is commonly referred to as the stiction region. These disturbances can interfere with the performance of the vehicle. For example, vibration in a satellite may prevent the satellite or its payload from accurately fixing on a desired target.

Another problem in typical reaction wheels are the disturbances created by the motors used to drive the reaction wheels and imperfections in the motor commutation circuits. These disturbances, typically referred to as torque ripple, are caused by the imperfect windings of the motor and commutation voltage offsets and gain mismatches in the electronics. As such, they generally have a frequency that is proportional to the rotational speed of the reaction wheel and amplitudes proportional to the output torque. These disturbances, like those caused by static friction, can interfere with the performance of the vehicle.

Each of these problems in current reaction wheel design can limit the functionality of the reaction wheel and the performance of the vehicle itself. Thus, what is needed is an improved reaction wheel system that minimizes these problems to provide an effective reaction wheel solution.

BRIEF SUMMARY OF THE INVENTION

The present invention provides a reaction wheel system that includes at least two rotors. The first rotor is the primary rotor that provides the large output torques to the vehicle. The second rotor is a vernier control rotor that provides relatively small output torques and can be used to reduce the disturbances created by motor ripple, provide precise torque output control and/or reduce the disturbances created by static friction.

Specifically, the primary rotor and vernier control rotor each rotate about a common axis. The vernier control rotor comprises a rotor that is relatively smaller than the primary rotor, and rotates independently of the primary rotor. Because the vernier control rotor can be rotated independently from the primary rotor, it can be used to significantly improve the performance of the reaction wheel system.

For example, the vernier control rotor can be rotated to provide precise control of the output torque created by the reaction wheel system. In this example, the smaller vernier control rotor is used to augment the torque provided by the primary rotor, resulting in more precise control over the total torque created by the reaction wheel system.

In another example, the vernier control rotor can be rotated to improve momentum control when the primary rotor is operating in its stiction region. In this example, the vernier control rotor is rotated outside its stiction region, providing the required output torque until the primary rotor is outside its stiction region. Thus, the amount of disturbances created by static friction in the primary rotor and the reaction wheel system is reduced.

In a third example, the vernier control rotor can be rotated to minimize the disturbances created by motor ripple. In this example, the vernier control motor is configured to provide output torque that at least partially cancels the motor ripple created by the primary rotor motor. Thus, the amount of disturbances created by motor ripple is reduced.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIGS. 6–8 are graphs illustrating output torque capability (T) as a function of rotor speed (ω).

DETAILED DESCRIPTION OF THE INVENTION

The present invention provides a reaction wheel system that includes at least two rotors. The first rotor is the primary rotor that provides the large output torques to the vehicle. The second rotor is a vernier control rotor. The primary rotor and vernier control rotor each rotate about a common axis. The vernier control rotor has an inertial mass that is less than the inertial mass of the primary rotor, and rotates independently of the primary rotor. Because the vernier control rotor can be rotated independently from the primary rotor, it can be used to significantly improve the performance of the reaction wheel system.

Specifically, the vernier control rotor is used to provide relatively small output torques. These relatively small output torques can be used to reduce the disturbances created by motor ripple, provide precise torque output control and/or reduce the disturbances created by static friction.

Figure 1:
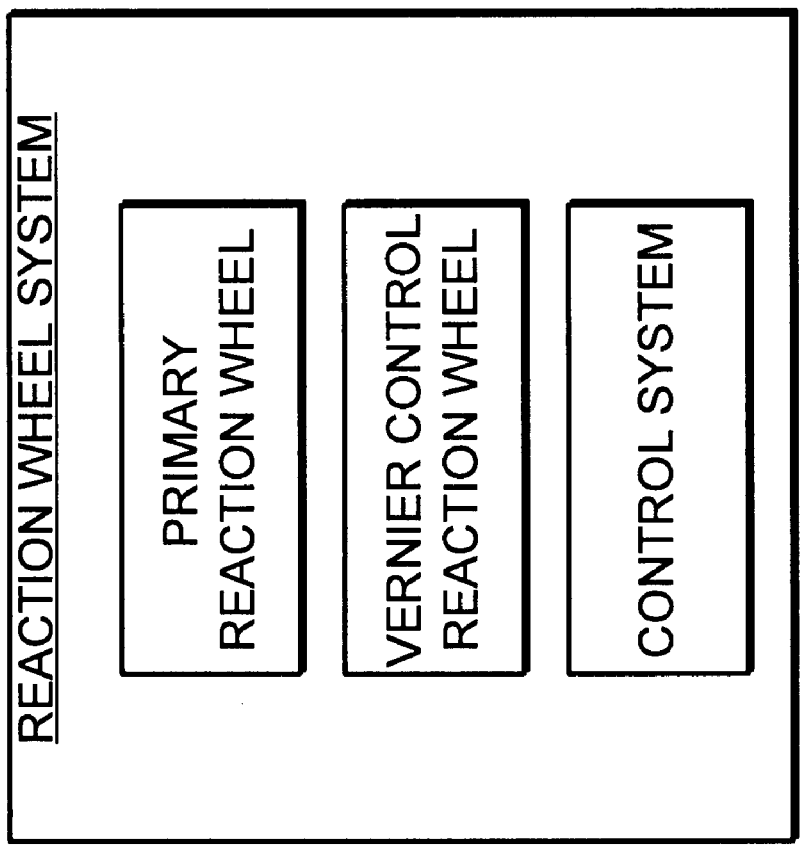
FIG. 1 is a schematic view a reaction wheel system.

Turning now to FIG. 1, a schematic view of a reaction wheel system is illustrated. The reaction wheel system includes a primary reaction wheel, a vernier control reaction wheel, and a control system. The primary reaction wheel includes a primary rotor, and the vernier control reaction wheel includes a vernier control rotor, with both rotating independently about a common axis. The primary reaction wheel provides the large output torques to the vehicle. The vernier control reaction wheel provides relatively small output torques and is used to improve the performance of the reaction wheel system.

The control system controls the rotational speed and direction of the primary reaction wheel to impart desired amounts of torque to the vehicle. Additionally, the control system independently controls the rotational speed and direction of the vernier control reaction wheel to provide relatively small output torques and can be used to reduce the disturbances created by motor ripple, provide precise torque output control and/or reduce the disturbances created by static friction.

For example, the control system can rotate the vernier control rotor to provide precise control of the output torque created by reaction wheel system. In this example, the smaller vernier control rotor is used to augment the torque provided by the primary rotor, resulting in more precise control over the total torque range created by the reaction-wheel system.

In another example, the vernier control rotor can be rotated to improve momentum control when the primary rotor is operating in its stiction region. In this example, the vernier control rotor is rotated outside its stiction region, providing the required output torque until the primary rotor is outside its stiction region. Thus, the amount of disturbances created by static friction in the primary rotor and the reaction wheel system is reduced.

In a third example, the control system rotates the vernier control rotor to minimize the disturbances created by motor ripple. In this example, the vernier control motor is configured to provide output torque that at least partially cancels the motor ripple created by the primary rotor motor. Thus, the amount of disturbances created by motor ripple is reduced.

Figure 2:
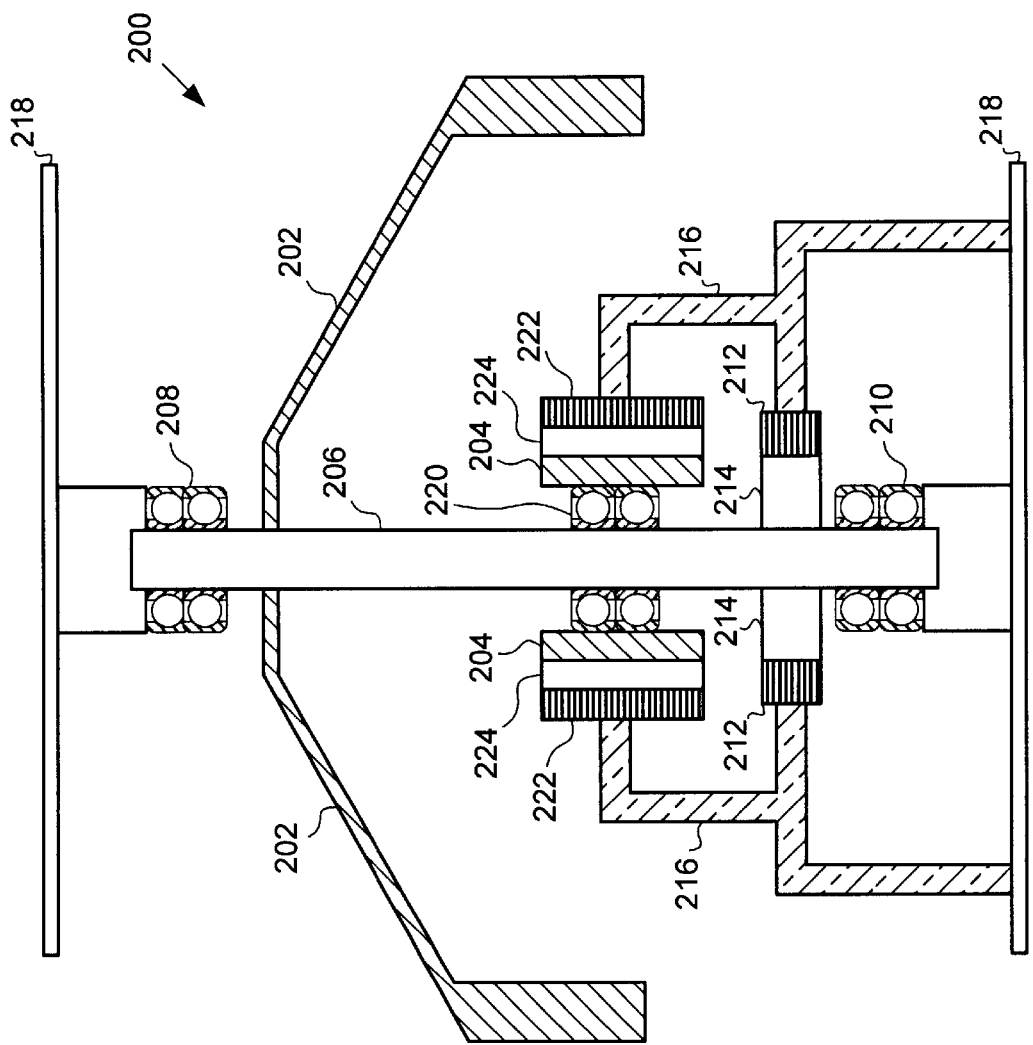
FIG. 2 is a cross-sectional schematic view a reaction wheel system implementation.

Turning now to FIG. 2, an exemplary reaction wheel system 200 is illustrated schematically. The reaction wheel system 200 includes a reaction wheel and a vernier control reaction wheel. The primary reaction wheel is comprised of a primary rotor 202, and the vernier control reaction wheel is comprised of a vernier control rotor 204. The primary rotor 202 and the vernier control rotor 204 rotate independently about a common axis.

In the illustrated example, the primary rotor 202 is coupled to a shaft 206 that rotates on the common axis. The shaft 206 rotates on bearings 208 and 210, and is driven by a primary motor that comprises a primary motor stator 212 and a primary motor rotor 214. The primary motor stator 212 is attached to a reaction wheel structure 216, which is attached to the vehicle through a base 218.

The vernier control rotor 204 rotates around the shaft 206 on bearings 220. The vernier control rotor is rotated by a vernier control motor that comprises vernier control stator 222 and vernier control rotor 224. The vernier control stator 222 is coupled attached to the reaction wheel structure 216, which is attached to the vehicle through a base 218.

In operation, the primary motor stator 212 and primary motor rotor 214 rotates the shaft 206, causing the primary rotor 202 to rotate and impart a torque on the vehicle through the reaction wheel structure 216 and base 218. The vernier control motor stator 222 and vernier control motor rotor 224 rotates the vernier control rotor 204 on bearings 220, likewise imparting a torque on the vehicle. It is important to note that while vernier control rotor rotates about shaft 206 the vernier control rotor can rotate independent of the shaft 206 and the primary rotor 202. Thus, the vernier control rotor 206 can be used to impart a torque on the vehicle independent of any torque provided by the primary rotor 202. It should be also noted that the primary rotor 202 and the vernier control rotor 204 rotate about a common axis, e.g., the axis defined by shaft 206. Finally, the primary rotor 202 and the vernier control rotor 204 each impart torque to the vehicle through a common mechanical ground, e.g., the reaction wheel structure 216 and the base 218.

It is generally preferable that the vernier control rotor 204 have substantially less rotational inertia than the primary control rotor 202. For example, in one embodiment the vernier control rotor 204 has a rotational inertia of less than 20 percent the rotational inertia of the primary rotor. 202. Even more preferably, the vernier control rotor 204 has a rotational inertia between of less than 5 percent the rotational inertia of the primary rotor 202.

The reaction wheel system 200 is just one example of how a reaction wheel system that includes a primary rotor and a vernier control rotor can be implemented. Many other reaction wheels may be suitable for modification to add a vernier control rotor. For example, of suitable reaction wheels include the HR0610 and HR14 available from Honeywell International, Inc. Other examples of reaction wheel designs can be found at U.S. Pat. No. 5,873,285 issued to Barnes and assigned to Honeywell International, Inc. Again, any other suitable reaction wheel design and structure that can be used or modified to include a primary rotor and a vernier control rotor that rotate in a common axis could also be implemented as an embodiment of the current invention.

The operation of reaction wheel system 200 is controlled by the control system. The control system controls the rotational speed and direction of the primary reaction wheel to impart desired amounts of torque to the vehicle. Additionally, the control system independently controls the rotational speed and direction of the vernier control reaction wheel to provide improved performance. For example, the control system can control the vernier rotor to provide reduce the disturbances created by motor ripple, provide precise torque output control and/or reduce the disturbances created by static friction. To accomplish this, the control system would typically comprise the sensors and control logic needed to control the rotation of the primary rotor and the vernier control rotor. The control system can then control the rotation of both rotors to achieve the desired result.

In one embodiment, the control system rotates vernier control rotor to minimize the disturbances created by motor ripple. Motor ripples are harmonic disturbances created by the windings of the motor used to drive the reaction wheel. As the speed of the reaction wheel changes, the frequency of the motor ripple created by the reaction wheel changes as well. In this example, is configured to provide output torque that at least partially cancels the motor ripple created by the primary rotor motor. Thus, the amount of disturbances created by motor ripple is reduced.

This can be accomplished by configuring the vernier control motor to be electrically commutated from the primary motor by in a way that is out of phase from the primary rotor and then controlling the vernier control rotor to track the rotation speed of the primary rotor. When so configured, the vernier control motor will create motor ripple that is directly out of phase with the motor ripple created by the primary motor. As such, the vernier control motor ripple will at least partially cancel motor ripple created by the primary rotor.

Figure 3:
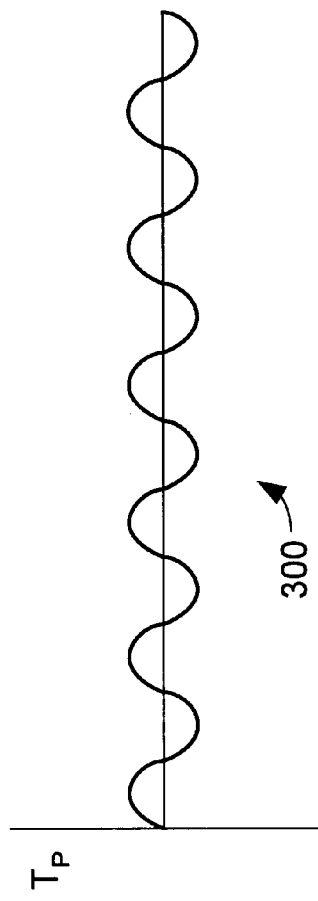
FIGS. 3–5 are graphs illustrating motor ripple cancellation.
Figure 4:
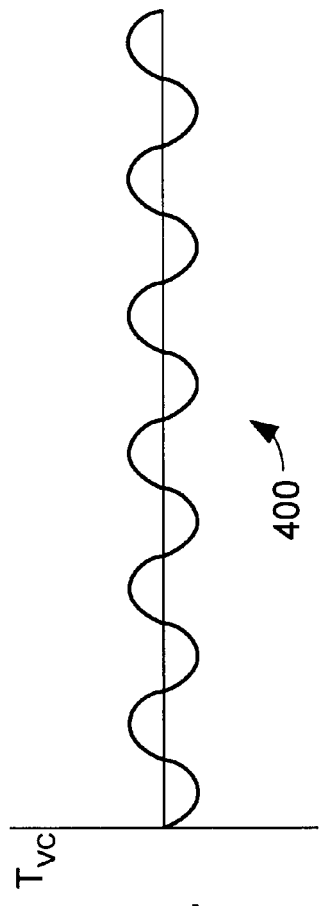
Figure 5:
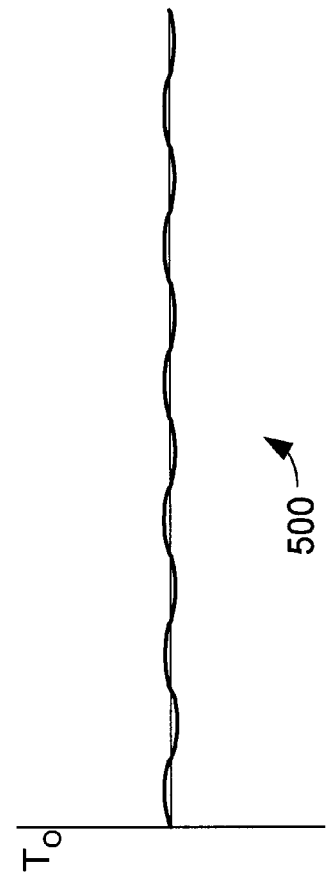

Turning now to FIG. 3, a graph 300 illustrates an exemplary motor ripple torque created by a primary rotor motor. As can be seen, the motor ripple comprises a periodic torque $T_p$ disturbance that is imparted to the vehicle. Turning now to FIG. 4, a graph 400 illustrates an exemplary motor ripple created by a vernier control motor that is electrically commutated from the primary motor by 180 degrees and operated at the same rotational speed as the primary rotor in FIG. 3. As illustrated, the vernier control motor creates a motor ripple $T_{VC}$ that is of substantially opposite phase and equal frequency as the primary motor ripple. As such, the ripple created by the vernier control motor will at least partially cancel out the primary motor ripple, thus reducing the disturbance that is imparted to the vehicle. This result is illustrated in FIG. 5, where a graph 400 illustrates an exemplary resulting torque disturbance $T_O$ that is outputted to the vehicle when the primary motor ripple has been at least partially cancelled out by the vernier control motor ripple. As illustrated, the resulting torque disturbance To that is imparted to the vehicle is substantially reduced over the original motor ripple created by the primary motor.

In some applications it will be desirable to provide a vernier control motor that is especially configured to create a motor ripple that can be used to substantially cancel the primary motor ripple. In addition to making the vernier control motor electrically commuted out of phase with the primary motor, the vernier control motor can be configured to create a motor ripple that is of substantially equal amplitude as the primary motor ripple. For example, where the vernier control rotor has substantially less rotational inertia than the primary rotor, the vernier control rotor would typically have a corresponding substantially less output torque than the primary motor. Such a motor would typically also create less motor ripple. In some applications it may be desirable to intentionally increase the motor ripple created by the vernier control motor to substantially equal that of the larger primary motor. This can be accomplished by using a motor with less precise windings, something that would normally not be desirable. Of course, other changes in motor design can also be used to alter the motor ripple created by the vernier control rotor.

In another embodiment, the control system rotates vernier control rotor to provide precise control of the output torque created by the reaction wheel system. In this application, the smaller vernier control rotor is used to augment the torque provided by the primary rotor, resulting in more precise control over the total torque created by the reaction wheel system. Thus, small changes in the output torque would be provided by the vernier control rotor, while larger changes in the output torque would be provided by the primary rotor. This system has the advantage of the ability to provide large torques with the primary rotor while also providing the ability to precisely control the amount of torque outputted with the vernier control rotor.

For example, in a reaction wheel system that uses 16-bit controller to control the commanded torque necessarily limits the output torque to one of $2^{15}$ increments. The minimum size of these increments is determined by the maximum available output torque. With the addition of a smaller vernier control reaction wheel, a second 16-bit controller can provide an additional set of $2^{15}$ increments, with the size of these increments determined by the maximum output torque of the smaller vernier control wheel. Thus, a more precise amount of control over the total output torque can be provided.

In a third embodiment, the control system rotates the vernier control rotor to minimize the disturbances created by static friction of the primary rotor. As a reaction wheel approaches zero speed static friction becomes the characteristic form of friction. This commonly occurs when the reaction wheel changes direction of rotation. This static friction, commonly referred to as stiction, causes disturbances that can be distributed throughout the vehicle as the wheel attempts to move away from zero speed. Specifically, the stiction prevents the reaction wheel from smoothly changing rotational speed. Instead, attempts to precisely change rotational speed at near zero speeds can cause erratic changes in rotational speed, resulting in disturbances that propagate through the vehicle. The rotational speeds in which static friction creates disturbances are commonly referred to as the stiction region.

To minimize the disturbances caused by operation in the stiction region, the reaction wheel system is operated such that the vernier control rotor is rotated outside its stiction region when the primary rotor is operating within its stiction region. Thus, the vernier control wheel can provide the required output torque until the primary rotor is outside its stiction region. This allows the reaction wheel system to produce a more consistent torque output throughout its range of operational rotational frequencies.

Turning now to FIGS. 6, 7, and 8, three graphs that illustrate output torque capability (T) as a function of rotor speed ($\omega$). Specifically, the graph 600 in FIG. 6 illustrates the torque capability ($T_1$) for an exemplary primary rotor ($I_1$) as a function of its rotor speed ($\omega_1$). As shown in FIG. 6, as the rotor speed $\omega_1$ approaches zero, stiction interferes with the ability of the primary rotor to provide output torque. Thus, in the area near zero rotor speed, the primary rotor $I_1$ is unable to reliably provide output torque. Likewise, graph 700 in FIG. 7 illustrates the torque capability ($T_2$) for an exemplary vernier control rotor ($I_2$) as a function of its rotor speed ($\omega_2$). As with the primary rotor, the vernier control rotor is subject to stiction region that can interfere with its ability to provide output torque.

In accordance with this embodiment, the vernier control rotor is rotated to improve momentum control when the primary rotor is operating in its stiction region. An example of this is shown in FIG. 8, where graph 800 illustrates the total torque capability ($T_O$) of the reaction wheel system ($I_1+I_2$) as a function of the combined rotor speed ($X\omega_1$)+ ($Y\omega_2$) where X and Y indicate rotor speeds of the primary and vernier rotors respectively, and where those rotor speeds are selected to never be coincident near zero. In this application the reaction wheel system is operated such that the vernier control rotor is rotated outside its stiction region when the primary rotor is operating within its stiction region, providing the required output torque of the system. Thus, the vernier control rotor provides the torque output capability until the primary rotor is again rotating outside its stiction region. Likewise, the primary rotor is operated outside its' stiction region as the vernier rotor passes through its stiction region. Therefore, the overall system has a more linear torque output capability throughout its entire operational range.

The present invention thus provides a reaction wheel system that includes at least two rotors. The first rotor is the primary rotor that provides the large output torques to the vehicle. The second rotor is a vernier control rotor. The primary rotor and vernier control rotor each rotate about a common axis. The vernier control rotor has an inertial mass that is less than the inertial mass of the primary rotor, and rotates independently of the primary rotor. Because the vernier control rotor can be rotated independently from the primary rotor, it can be used to significantly improve the performance of the reaction wheel system. Specifically, the vernier control rotor is used to provide relatively small output torques. These relatively small output torques can be used to reduce the disturbances created by motor ripple, provide precise torque output control and/or reduce the disturbances created by static friction.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A reaction wheel system, the reaction wheel system comprising:
   a) a primary reaction wheel, the primary reaction wheel including a primary rotor having an inertial mass controllably rotating about a common axis;
   b) a vernier reaction wheel, the vernier reaction wheel including a vernier rotor having an inertial mass less than the primary rotor inertial mass, the vernier reaction wheel controllable rotating independently about the common axis; and
   c) a control system, the control system selecting rotational speeds of the primary rotor and vernier control rotor to impart a torque on a vehicle.

2. The reaction wheel system of claim 1 wherein the control system selects rotational speeds of the vernier control rotor to precisely control the torque imparted on the vehicle.

3. The reaction wheel system of claim 1 wherein the control system selects rotational speeds of the vernier control rotor to operate outside a vernier control rotor stiction region when the primary rotor operates in a primary rotor stiction region.

4. The reaction wheel system of claim 1 wherein the control system selects rotational speeds of the vernier control rotor to provide a vernier motor ripple torque to at least partially cancel a primary motor ripple torque.

5. The reaction wheel system of claim 1 wherein the vernier reaction wheel inertial mass is less than 20 percent the primary reaction wheel inertial mass.

6. The reaction wheel system of claim 1 wherein the vernier reaction wheel inertial mass is less than 5.0 percent the primary reaction wheel inertial mass.

7. The reaction wheel system of claim 1 wherein the primary reaction wheel includes a primary motor and wherein the vernier reaction wheel includes a vernier motor and wherein the vernier motor is electrically commutated from the primary motor such that the vernier motor creates a motor ripple out of phase of a primary motor ripple.

8. A reaction wheel system, the reaction wheel system comprising:
   a) a primary reaction wheel, the primary reaction wheel including a primary rotor having an inertial mass coupled to a shaft controllably rotating about a common axis and a primary motor for rotating the shaft and the primary rotor;
   b) a vernier reaction wheel, the vernier reaction wheel including a vernier rotor having an inertial mass less than 20 percent the primary rotor inertial mass, the vernier reaction wheel controllable rotating around the shaft about the common axis, the vernier reaction wheel rotating independently of the shaft, the vernier reaction wheel including a vernier motor for rotating the vernier reaction wheel; and
   c) a control system, the control system controlling the primary motor and vernier control motor to rotate the primary rotor and the vernier control rotor to impart a torque on a vehicle.

9. The reaction wheel system of claim 8 wherein the control system controls the primary motor to provide relatively large amounts of torque and controls the vernier control motor to provide relatively small amounts of torque to precisely control the torque imparted to the vehicle.

10. The reaction wheel system of claim 8 wherein the control system controls the vernier control motor to operate the vernier reaction wheel outside a vernier control rotor stiction region when the control system controls the primary motor to operate in a primary rotor stiction region.

11. The reaction wheel system of claim 8 wherein the control system controls the vernier motor to provide a vernier motor ripple to at least partially cancel a primary motor ripple torque caused by the primary motor.

12. The reaction wheel system of claim 11 wherein the vernier motor is electrically commutated from the primary motor such that the vernier motor creates the vernier motor ripple out of phase of the primary motor ripple.

13. The reaction wheel system of claim 12 wherein the vernier rotor inertial mass is less then 5 percent the primary rotor inertial mass.

14. A method imparting a torque on a vehicle, the method comprising the steps of:
   a) providing a primary reaction wheel, the primary reaction wheel including a primary rotor having an inertial mass controllably rotating about a common axis;
   b) providing a vernier reaction wheel, the vernier reaction wheel including a vernier rotor having an inertial mass less than the primary rotor inertial mass, the vernier reaction wheel controllable rotating independently about the common axis
   c) selecting rotational speeds of the primary rotor and vernier control rotor to impart a torque on a vehicle.

15. The method of claim 14 wherein the step of selecting rotational speeds of the vernier control rotor comprises selecting rotational speeds of the vernier control rotor to precisely control the torque imparted on the vehicle.

16. The method of claim 14 wherein the step of selecting rotational speeds of the primary rotor and vernier control rotor to impart a torque on a vehicle comprises selecting rotational speeds of the vernier control rotor to operate outside a vernier control rotor stiction region when the primary rotor operates in a primary rotor stiction region.

17. The method of claim 14 wherein the step of selecting rotational speeds of the primary rotor and vernier control rotor to impart a torque on a vehicle comprises selecting rotational speeds of the vernier control rotor to provide a vernier motor ripple torque to at least partially cancel a primary motor ripple torque.

18. The method of claim 14 wherein the wherein vernier reaction wheel inertial mass is less than 20 percent the primary reaction wheel inertial mass.

19. The method of claim 14 wherein the wherein vernier reaction wheel inertial mass is less than 5 percent the primary reaction wheel inertial mass.

20. The method of claim 14 wherein the primary reaction wheel includes a primary motor and wherein the vernier reaction wheel includes a vernier motor and wherein the vernier motor is electrically commutated from the primary motor such that the vernier motor creates a motor ripple out of phase of a primary motor ripple.

* * * * *